United States Patent
Wada et al.

(10) Patent No.: US 6,181,653 B1
(45) Date of Patent: Jan. 30, 2001

(54) DISC REPRODUCING AND RECORDING APPARATUS WITH DISPLAY OF THE AMOUNT OF DATA IN A BUFFER MEMORY

(75) Inventors: Isao Wada; Junichi Aramaki, both of Chiba; Akihisa Inatani, Kanagawa; Yoshihiro Kajiyama, Chiba, all of (JP)

(73) Assignee: Sony Corporation, Tokyo (JP)

( * ) Notice: Under 35 U.S.C. 154(b), the term of this patent shall be extended for 0 days.

(21) Appl. No.: 08/267,579

(22) Filed: Jun. 28, 1994

Related U.S. Application Data

(63) Continuation of application No. 07/978,121, filed on Nov. 18, 1992, now abandoned.

(30) Foreign Application Priority Data

| Nov. 25, 1991 | (JP) | 3-309403 |
|---|---|---|
| Feb. 19, 1992 | (JP) | 4-069588 |
| Sep. 30, 1992 | (JP) | 4-285474 |

(51) Int. Cl.$^7$ ................................................ G11B 7/004
(52) U.S. Cl. ........................................ 369/48; 369/54
(58) Field of Search ............................ 369/60, 54, 48, 369/124, 59, 124.01–124.15

(56) References Cited

U.S. PATENT DOCUMENTS

| 3,938,105 | * | 2/1976 | Lechner | 360/48 |
|---|---|---|---|---|
| 4,322,759 | * | 3/1982 | Zenzefilis | 369/111 |
| 4,391,530 | * | 7/1983 | Wakubayashi et al. | 369/23 X |
| 4,796,247 | * | 1/1989 | Vogelsang | 369/44.32 X |
| 4,860,272 | * | 8/1989 | Nishikawa et al. | 360/78.04 X |
| 4,872,073 | * | 10/1989 | Fincher et al. | 360/51 |
| 4,896,311 | * | 1/1990 | Ishihara | 369/47 |
| 5,032,927 |   | 7/1991 | Watanabe et al. | 358/335 |
| 5,212,678 | * | 5/1993 | Roth et al. | 369/43 X |

FOREIGN PATENT DOCUMENTS

| 0 429 139 A1 | 5/1991 | (EP) . |
|---|---|---|
| 0 463 183 A1 | 1/1992 | (EP) . |
| 2 136 192 | 9/1984 | (GB) . |
| WO 91/11002 | 1/1991 | (WO) . |

\* cited by examiner

*Primary Examiner*—W. R. Young
(74) *Attorney, Agent, or Firm*—Limbach & Limbach L.L.P.

(57) ABSTRACT

The present invention is directed to a disc reproducing apparatus in which a signal recorded on a disc is optically read out from the disc and reproduced as an audio signal. This disc reproducing apparatus includes a memory in which digital data is stored temporarily, a controller for controlling write and read of the memory such that the digital data is intermittently written in the memory at the first transfer rate and the digital data is continuously read out from the memory at a second transfer rate lower than the first transfer rate and a display device for displaying an amount of the digital data stored in the memory so that an increase or decrease of the amount of the digital data can be visually confirmed. Further, the present invention is directed to a disc recording apparatus in which an input digital audio signal is encoded and recorded on a disc. This disc recording apparatus includes a memory in which compressed data is temporarily stored. A controller for controlling the memory such that the compressed data is continuously written in the memory and the compressed data stored in the memory is intermittently read out from the memory at every predetermined data amount, and a display device for displaying a storage amount of the compressed data stored in the memory so that an increase or decrease of the amount of the compressed data can be visually confirmed.

15 Claims, 5 Drawing Sheets

DISC REPRODUCING AND RECORDING APPARATUS WITH DISPLAY OF THE AMOUNT OF DATA IN A BUFFER MEMORY

This is a continuation of application Ser. No. 07/978,121 filed on Nov. 18, 1992, now abandoned.

BACKGROUND OF THE INVENTION

1. Field of the Invention

The present invention relates to a disc reproducing apparatus and a disc recording apparatus for use with a magneto-optical disc driving apparatus that includes a memory in order to present a reproduced sound from being interrupted by an external vibration.

2. Description of the Prior Art

CD players are known to reproduce a CD (compact disc) in which digital audio data is recorded on spiral tracks as rows of pits. Upon playback, the CD player reproduces a digital audio data by detecting that a laser beam radiated on and reflected from on the tracks of the disc is changed in intensity due to the existence of pits while rotating the disc at a constant linear velocity.

Under ordinary working conditions, the CD player can reproduce audio data without trouble according to error correction processing using an error detection code and an error correction code.

It is frequently observed that a CD player having an optical pickup cannot correctly reproduce data because the servo system (such as a focusing servo and a tracking servo of the optical system) is disabled by an mechanical external disturbance such as vibration, shock or the like. Such accidents cannot be compensated for even by the above error correction processing. The playback is temporarily interrupted, causing the reproduced sound to be interrupted.

Unlike home CD players of the floor type, a conventional vehicular CD player or portable CD player that tends to be causing the very large vibrations or impulses includes a mechanical vibration isolating mechanism in order to present the reproduced sound from being interrupted. Such a vibration isolating mechanism is not always sufficient and cannot suppress a reproduced sound from being interrupted depending on the magnitude of vibration or impulse.

In order to completely prevent the reproduced sound from being interrupted, it is proposed to prevent a reproduced sound from being interrupted by reading out reproduced data from a semiconductor memory serving as a data buffer of a relatively large capacity. That is, when the servo system such as the focusing servo and the tracking servo of the optical pickup is disabled by the mechanical external disturbance such as vibration, impulse or the like, reproduced data that has been stored in the semiconductor memory until the servo system returns to the normal condition, are sequentially read out to thereby prevent the playback from being interrupted.

In the conventional apparatus, data stored in the semiconductor memory is utilized to present the mechanical external disturbance such as vibration, impulse or the like in the reproduced sound. The storage capacity of the semiconductor memory is limited so that, when the external disturbance takes place several times, a reproduced sound may be interrupted. Therefore, the user cannot discern the reason why the reproduced sound is interrupted, i.e., the reproduced sound might be interrupted because the function of the semiconductor memory is not operated correctly or because the semiconductor memory suffers from a load that exceeds a storage capacity thereof.

OBJECTS AND SUMMARY OF THE INVENTION

Therefore, it is a general object of the present invention to provide an improved disc reproducing apparatus and recording apparatus in which the aforesaid shortcomings and disadvantages of the prior art can be eliminated.

It is an object of the present invention to provide a disc reproducing apparatus and disc recording apparatus in which the user can easily confirm the cause that a reproduced sound is interrupted.

As a first aspect of the present invention, there is provided a disc reproducing apparatus in which a signal recorded on a disc is optically read out from the disc and reproduced as an audio signal. This disc reproducing apparatus comprises an optical pickup tracing tracks formed on the disc to optically read out a signal recorded on the disc. The disc reproducing apparatus further includes a first decoding unit for decoding an output signal of the optical pickup and outputting the same at a first transfer rate. The disc reproducing apparatus further includes a memory in which digital data output from the first decoding unit is stored temporarily. The disc reproducing apparatus further includes a controller for controlling write and read of the memory such that the digital data is intermittently written in the memory at the first transfer rate and the digital data is continuously read out from the memory at a second transfer rate lower than the first transfer rate. The disc reproducing apparatus further includes a second decoding unit for decoding the digital data read out from the memory and outputting the same as an audio signal at the second transfer rate. The disc reproducing apparatus further includes a display device for displaying an amount of the digital data stored in the memory so that an increase or decrease of the amount of the digital data can be visually confirmed.

As a second aspect of the present invention, there is provided a disc recording apparatus in which an input digital audio signal is encoded and recorded on a disc. This disc recording apparatus comprises a first encoding unit for compressing an input digital audio signal. The disc recording apparatus further includes a memory in which compressed data stored in the memory is temporarily stored. The disc recording apparatus further includes a second encoding unit for intermittently receiving the compressed data stored in the memory and outputting encoded data as recording data to be recorded on the disc at its predetermined position. The disc recording apparatus further includes a controller for controlling the memory such that the compressed data from the first encoding unit is continuously written in the memory and the compressed data stored in the memory is read out from the memory at every predetermined data amount. The disc recording apparatus further includes a display device for displaying a storage amount of the compressed data stored in the memory so that an increase or decrease of the amount of the compressed data can be visually confirmed.

According to the first and second aspects of the present invention, since the amount of data stored in the memory is displayed so that the user can recognize the operation state of the memory intuitively and readily.

BRIEF DESCRIPTION OF THE DRAWINGS

A better understanding of other objects, features, and advantages of the present invention can be gained from a consideration of the following detailed description of an illustrative embodiment thereof, in conjunction of the figures of the accompanying drawings, in which.

DETAILED DESCRIPTION OF THE PREFERRED EMBODIMENT

The present invention will now be described with reference to the drawings.

Figure 1:
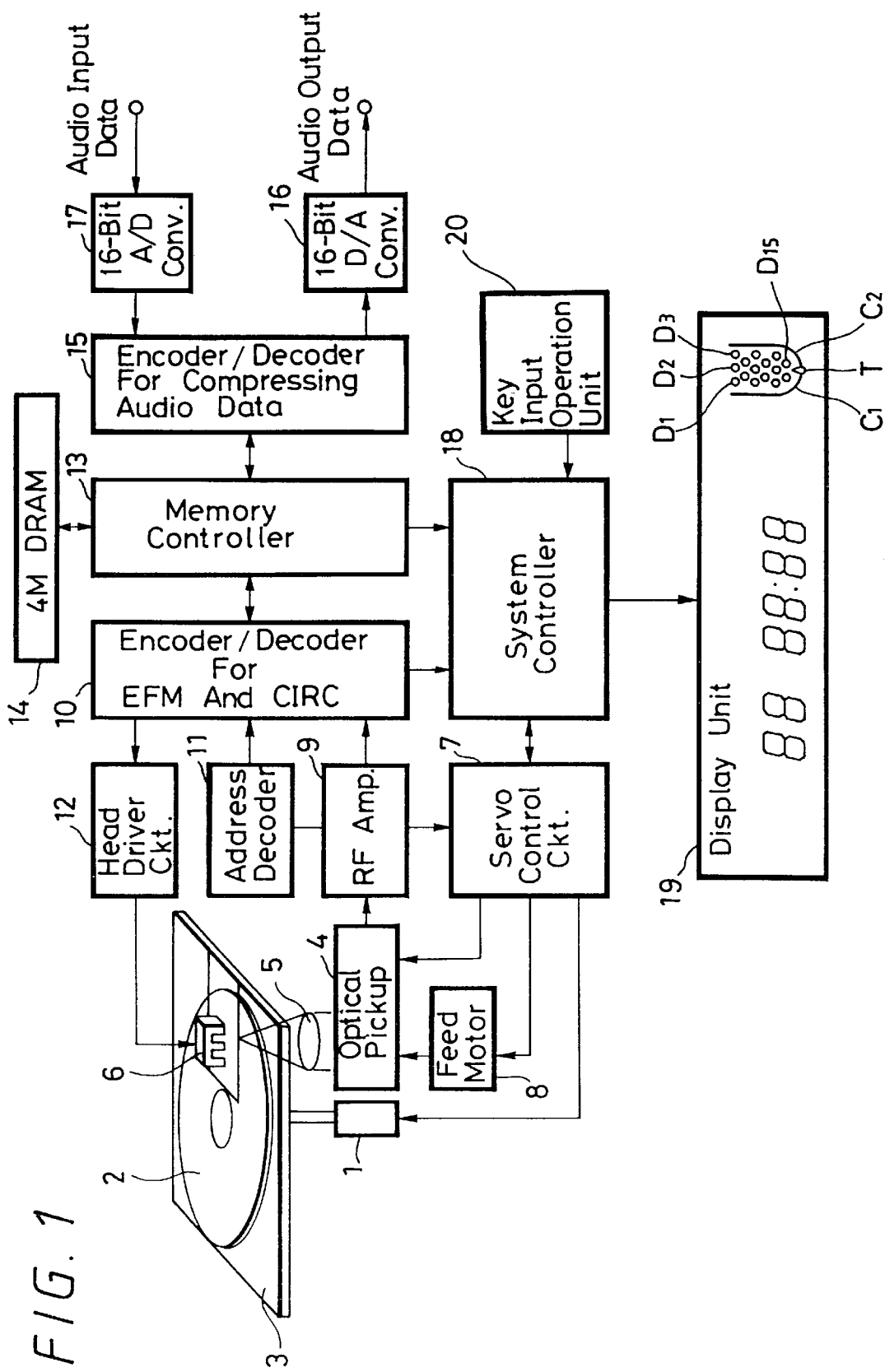
FIG. 1 is a block diagram showing an embodiment of a magneto-optical disc apparatus to which a disc reproducing apparatus and recording apparatus according to the present invention is applied.

FIG. 1 of the accompanying drawings shows in block form an arrangement of an embodiment of a magneto-optical disc apparatus to which the disc reproducing apparatus and recording apparatus according to the present invention is applied.

As shown in FIG. 1, a magneto-optical disc 2 is accommodated in a disc cartridge 3. When the disc cartridge 3 in which the magneto-optical disc 2 is accommodated is loaded to the disc reproducing and recording apparatus at its predetermined position, the magneto-optical disc 2 is rotated at a predetermined speed by a spindle motor 1. An optical pickup 4 having an objective lens 6 is disposed under the magneto-optical disc 2 and a recording magnetic head 6 is disposed above the magneto-optical disc 2 in a confronting relation to the optical pickup 4.

The optical pickup 4 includes, in addition to the objective lens 5, optical assembly parts such as a laser light source such as a laser diode or the like, a collimator lens for collimating a laser beam from the laser diode, a polarizing beam splitter for separating a reflected-back laser beam from the magneto-optical disc 2 from the laser beam traveling from the laser diode to the magneto-optical disc 2, a cylindrical lens for processing the laser beam reflected from the magneto-optical disc 2 in an astigmatism fashion or the like, and a photodiode for detecting the laser beam reflected on the magneto-optical disc 2 or the like (components of the optical pickup 4 are not separately shown).

A signal output from the photodiode (not shown) incorporated within the optical pickup 4 is input to an RF (radio frequency) amplifier 9 and thereby processed in a matrix fashion. Therefore, a focusing error signal based on an astigmatism method and a tracking error signal based on a push-pull method, for example, are generated from the RF amplifier 9 and then output to a servo control circuit 7.

The servo control circuit 7 comprises a focusing servo control circuit, a tracking servo control circuit, a spindle motor servo control circuit, a sled servo control circuit or the like (components of the servo control circuit 7 are not separately shown). The focusing servo control circuit effects the focusing servo on the optical system of the optical pickup 4 such that a focusing error signal becomes zero. The tracking servo control circuit effects the tracking servo on the optical system of the optical pickup 4 such that a tracking error signal becomes zero. The spindle motor servo control circuit controls the spindle motor 1 so that the spindle motor 1 rotates the magneto-optical disc 2 at a predetermined rotational speed. The sled servo control circuit controls a feeding motor 8 such that the optical pickup 4 and the magnetic head 6 are moved toward the magneto-optical disc 2 at its predetermined target track position specified by a system controller 18.

The servo control circuit 7 supplies the system controller 18 with information representative of operation conditions of respective parts that are controlled by the above respective servo control circuits.

The RF amplifier 9 extracts from the output signal of the optical pickup 4 a signal corresponding to an address that was recorded on the magneto-optical disc 2 by wobbling the tracks and then outputs the same to an address decoder 11. The address decoder 11 decodes an address from the input signal and outputs the decoded address to an encoder/decoder 10.

The RF amplifier 9 further supplies the encoder/decoder 10 with an RF signal and an a MO (magneto-optical) signal corresponding to the signal recorded on the magneto-optical disc 2.

The encoder/decoder 10 demodulates the MO signal or RF signal input from the RF amplifier 9 in an eight-to-fourteen system and also error-corrects the same. The MO signal or RF signal thus processed is stored in a DRAM (dynamic random access memory) 14 that is served as a vibration-isolating memory through a memory controller 13. The DRAM 14 has a storage capacity of 4 Mbits, for example, and this storage capacity of the DRAM 14 corresponds to an audio signal having a duration of 12 seconds.

Data read out from the DRAM 14 is supplied through the memory controller 13 to an encoder/decoder 15 for compressing and expanding an audio signal, in which it is decoded and then fed to a 16-bit digital-to-analog (D/A) converter 16. Data, thus converted in the form of digital to analog data by the D/A converter 16, is output to a speaker (not shown) as an audio output. The encoder/decoder 15 includes a system that is disclosed in Japanese Laid-Open Patent Publication No. 3-112221. The audio signal can be compressed and expanded by the encoder/decoder 15 at high-efficiency without deteriorating the sound quality.

An analog audio signal output from a microphone or tuner (not shown) is supplied to a 16-bit analog-to-digital converter 17, in which it is converted into digital audio data and then supplied to the encoder/decoder 15, thereby being timebase-compressed to ⅕, for example. The audio data thus compressed by the encoder/decoder 15 is supplied through the memory controller 13 to the DRAM 14, in which it is stored temporarily. Data read out from the DRAM 14 is supplied to the encoder/decoder 10, in which it is added with an error-correction code and modulated in the EFM method and then fed to a head driver circuit 12. The head driver circuit 12 drives the magnetic head 6 in response to the input signal.

The system controller 18 is a microcomputer that comprises a CPU (central processing unit) for controlling operation of respective portions, a ROM (read-only memory) in which a control program used by the CPU is stored in advance, a RAM (random access memory) in which various data are stored temporarily and an I/O (input/output) interface through which various data are exchanged between the CPU and the external apparatus.

The system controller 18 is connected to a key input operation unit 20 that is operated to input various operations. A display unit 19 that displays thereon operation conditions of respective portions. The key input operation unit 20 includes a mode selection key for switching the vibration isolating mode and the normal mode, in addition to fundamental operation keys such as a play key, a stop key or the like.

Operation of this apparatus will be described. First, operation under the condition that the normal mode is selected by operating the key input operation unit 20.

When the recording mode is instructed by operating the key input operation unit 20, the system controller 18 controls respective portions to set the recording mode. At that time, the analog audio signal input to the A/D converter 17 is converted into digital audio data in which one sample is formed of 16 bits and then fed to the encoder/decoder 15 for compressing the audio data. The encoder/decoder 15 timebase-compresses the input digital data to $\frac{1}{5}$ in accordance with a predetermined rule.

Digital data thus timebase-compressed by the encoder/decoder 15 is supplied though the memory controller 13 to the encoder/decoder 10. The encoder/decoder 10 adds predetermined error-detection and error-correction codes to the input digital data and modulates the same in the EFM fashion. A signal encoded by the encoder/decoder 10 is supplied to the head driver circuit 12 and the head driver circuit 12 drives the recording magnetic head 6 in response to the encoded signal supplied thereto. Therefore, a magnetic field (of N or S polarity) is applied to the magneto-optical disc 12 in response to recording data.

The system controller 18 controls the optical pickup 4 through the servo control circuit 7 so that the laser diode (not shown) incorporated in the optical pickup 4 generates a laser beam. This laser beam is radiated on and converged on the magneto-optical disc 2 through the objective lens 5. An intensity of this laser beam is set to a value that holds the magneto-optical disc 2 at a temperature higher than a Curie temperature. Hence, data is recorded on the magneto-optical disc 2 in a magneto-optical fashion.

When data is recorded on the magneto-optical disc 2, the magneto-optical disc 2 is rotated by the spindle motor 1 at a predetermined speed. The servo control circuit 7 drives the feed motor 8 to move the optical pickup 4 along the radial direction of the magneto-optical disc 2, whereby an information recording point is moved to a predetermined track on the magneto-optical disc 2.

When the playback mode is instructed by operating the key input operation unit 20, the system controller 18 controls respective portions to set the playback mode. At that time, the servo control circuit 7 controls the optical pickup 4 so that the intensity of the laser beam emitted from the laser diode is set to be a value smaller than that in the recording mode. Therefore, even when radiated with the laser beam, the magneto-optical disc 2 can be prevented from being heated to greater than the Curie temperature and the recorded data can be prevented from being erased. Thus, the recorded data can be reproduced reliably.

The RF amplifier 9 separates the MO signal from the output signal output by the optical pickup 4 and supplies the MO signal to the encoder/decoder 10. The encoder/decoder 10 demodulates the input MO signal in an EFM fashion and error-corrects and error-detects the same. Data decoded by the encoder/decoder 10 is supplied through the memory controller 13 to the encoder/decoder 15. The encoder/decoder 15 timebase-expands the input data five times so that the input data recovers its original timebase. Digital data decoded by the encoder/decoder 15 is supplied to a digital-to-analog (D/A) converter 16, in which it is converted in the form of a digital to analog signal and supplied to a speaker or the like as the original analog audio signal.

Since the timebase of the data to be recorded is compressed to $\frac{1}{5}$ by the encoder/decoder 15, the recording operation on the magneto-optical disc 2 is not started until recording data of a predetermined amount is collected. In other words, although the analog audio signal to be recorded is input continuously, the recording operation on the magneto-optical disc 2 is effected intermittently. Similarly, digital audio data, intermittently reproduced from the magneto-optical disc 2, is timebase-expanded five times by the encoder/decoder 15 and output as a consecutive analog audio signal.

Operation in the case such that the vibration isolation mode is selected by operating the key input operation unit 20 will be described.

The system controller 18 controls the memory controller 13 so that data to be recorded on the magneto-optical disc 2 or data reproduced from the magneto-optical disc 2 is temporarily stored in the DRAM 14. Other operations are similar to those in the normal mode. The writing and reading of data in and from the DRAM 14 will be described below.

Figure 2:
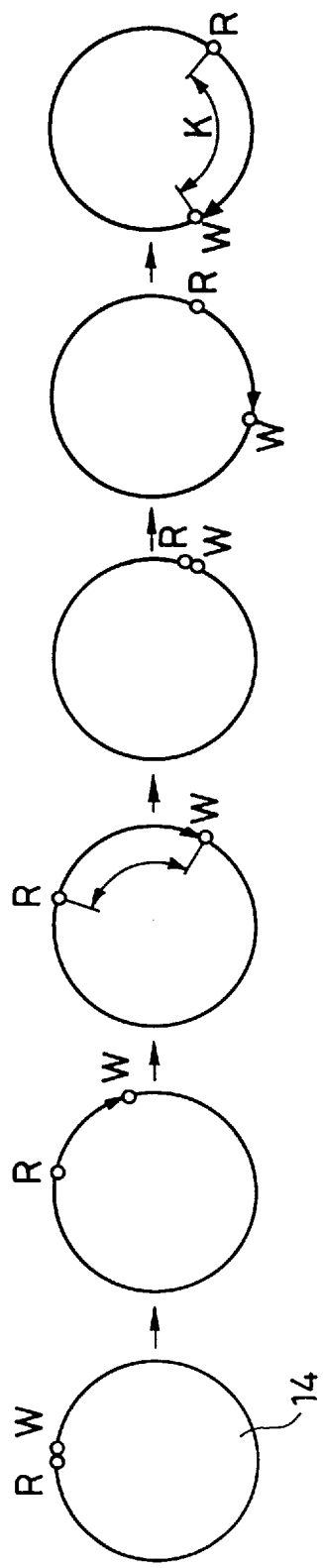
FIG. 2 is a schematic diagram used to explain operation of a DRAM (dynamic random access memory) shown in FIG. 1 in the recording mode.

In the recording mode, the memory controller 13 controls the writing and reading of data in and from the DRAM 14 as shown in FIG. 2. In FIG. 2, W depicts a write pointer and R depicts a read pointer.

The memory controller 13 continuously increments a write pointer W at speed corresponding to a data write and transfer rate (bit rate) to write data supplied from the encoder/decoder 15 in the DRAM 14 as shown in FIG. 2. When the amount of data written in the DRAM 14 exceeds k, a read pointer R is incremented intermittently at speed corresponding to a data read-out transfer rate (higher than the write transfer rate). Then, the recorded data is read out from the DRAM 14 by k and then supplied to the encoder/decoder 10.

Such operation is repeated sequentially. Consequently, the read-out of data from the DRAM 14 (or the writing of data on the magneto-optical disc 2) is carried out intermittently. The system controller 18 controls the optical pickup 4 through the servo control circuit 7 so that the optical pickup 4 is repeatedly set in the standby mode until the position of the recording point reaches the predetermined position. Then, data can be continuously (not always continuously) recorded on successive tracks on the magneto-optical disc 2.

As shown in FIG. 2, the DRAM 14 can constantly keep the data writing area larger than a predetermined amount so that, when the recording point is displaced from the correct position due to the external disturbance or the like, the system controller 18 detects such displacement of the recording point (displacement of the recording point can be detected by monitoring address data output from the address decoder 11). At that time, the servo control circuit 17 controls the optical pickup 4 so as to interrupt the recording operation on the magneto-optical disc 2.

When the address is returned to the position at which the recording is interrupted, the recording is re-started. While the analog audio signal to be recorded is continuously input while the recording point is returned, such analog audio data is recorded in a vacant area of the DRAM 14, thereby preventing the recording data from overflowing and being interrupted.

Figure 3:
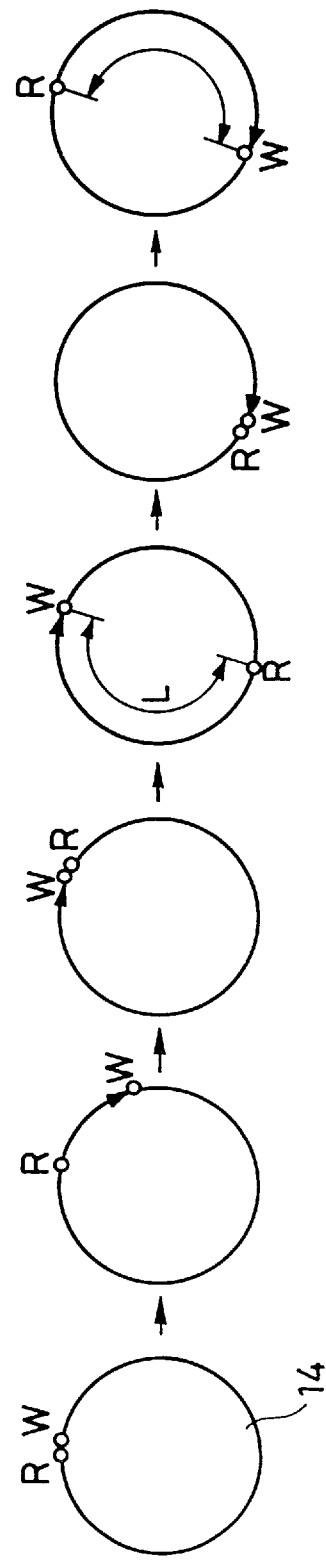
FIG. 3 is a schematic diagram used to explain operation of the DRAM shown in FIG. 1 in the playback mode.

In the playback mode, the memory controller 13 controls the DRAM 14 as shown in FIG. 3. More specifically, the memory controller 13 intermittently increments the write pointer W of the DRAM 14 at speed corresponding to a high transfer rate (speed corresponding to the read-out transfer rate in the recording mode) to write reproduced data, which was reproduced from the magneto-optical disc 2 and supplied thereto from the encoder/decoder 10, in the DRAM 14. Further, the memory controller 13 continuously increments the read pointer R at speed corresponding to a low transfer rate (speed corresponding to the write transfer rate in the recording mode), whereby data written in the DRAM 14 is read out and supplied to the encoder/decoder 15.

When the write pointer W catches up with the read pointer R, the writing on the DRAM 14 is stopped. Then, the amount of data written in the DRAM 14 (i.e., amount of data written in the area between the write pointer W and the read pointer R) becomes less than a predetermined amount L, the writing on the DRAM 14 is resumed. The writing on the DRAM 14 (i.e., reproduction from the magneto-optical disc 2) is carried out intermittently. The system controller 18 urges the optical pickup 4 to be placed in the standby mode at the predetermined position when the playback operation is not carried out, similarly to the recording mode.

Upon playback, when the vibration isolation mode is selected, data of more than the predetermined amount L is constantly written on the DRAM 14. Therefore, when a reproducing point is shifted from the original position to another position due to an external disturbance or the like while data is being played back from the magneto-optical disc 2, the system controller 18 detects such displacement of the reproducing point and temporarily interrupts the reproducing operation of data from the magneto-optical disc 2. Then, the system controller 18 monitors an address decoded by the address decoder 11 and moves the reproducing point to the original position. When the reproducing point is returned to the original position, the playback operation is resumed from the original position of the reproducing point. Data is continuously read out from the DRAM 14 until the reproducing point is returned to the original position, thereby preventing the audio signal output from the A/D converter 16 from being interrupted.

Figure 4:
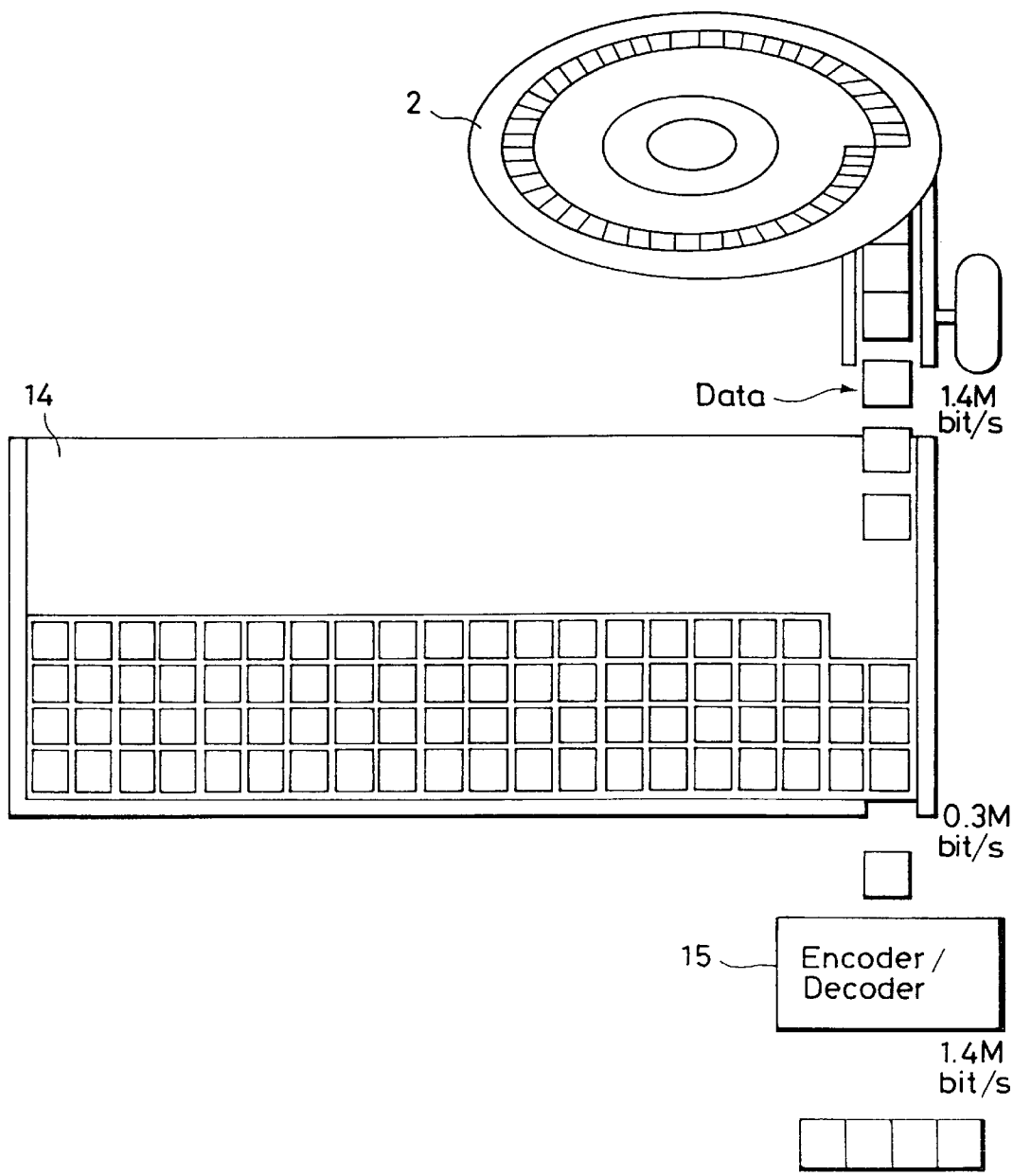
FIG. 4 is a schematic representation used to explain operation of the DRAM shown in FIG. 1 in the playback mode.

FIG. 4 of the accompanying drawings schematically shows operation of the DRAM 14 upon playback. As shown in FIG. 4, data reproduced from the magneto-optical disc 2 is intermittently reproduced from the magneto-optical disc 2 at a transfer rate of 1.4 Mbit/second, for example, and temporarily written in the 4M bit-DRAM 14. Data written in the DRAM 14 is read out from the DRAM 14 at a transfer rate of 0.3Mbit/second and supplied to the encoder/decoder 15. The encoder/decoder 15 timebase-expands the input data about five times and continuously outputs the thus processed data to the D/A converter 16 at a transfer rate of 1.4Mbit/second. The storage capacity of 4M bits of the DRAM 14 is equivalent to the reproducing time period of about 12 seconds so that, even when the reproducing point is shifted from the correct position due to the external disturbance or the like, if the reproducing point is returned to the original position within 12 seconds, then a reproduced sound can be prevented from being interrupted.

Examples of display message on the display unit 19 will be described with reference to FIG. 5 of the accompanying drawings.

The display unit 19 displays a message corresponding to the storage amount of the DRAM 14 under the control of the system controller 18. In this embodiment, there are provided fixed display elements C1, C2 which express a container that urges the user to remember the storage capacity of the DRAM 14, and variable display elements D1, D2, . . . , D15 and T disposed at the positions encircled by the fixed display elements C1, C2 so as to display data amount (amount of data to be written) stored in the DRAM 14. The leftmost portion in FIG. 5 indicates an example of display that an amount of data stored in the DRAM 14 is zero. The rightmost portion in FIG. 5 indicates an example of display showing the condition such that data are written in the DRAM 14 at its full storage capacity.

Figure 5:
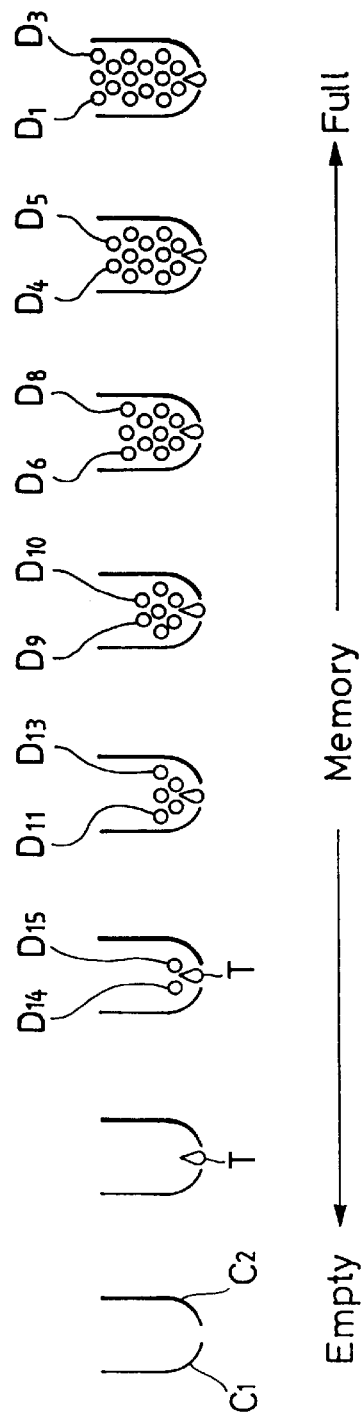
FIG. 5 is a schematic diagram used to explain an example of a graphic pattern displayed on a display unit shown in FIG. 1.

When the normal mode is selected, the graphic pattern shown in FIG. 5 is not displayed on the display unit 19 in FIG. 1. When the vibration isolating mode is selected, the fixed display elements C1, C2 representative of the containers that urges the user to remember the storage capacity of the DRAM 14 shown on the left end of FIG. 5 are displayed on the display unit 19 for the first time, whereafter the playback operation is started. As playback data stored in the DRAM 14 is increased, only the variable display element T of the teardrop type is displayed initially.

Then, the dot-type variable display elements D15 and D14 are displayed above the variable display element T that is disposed in the bottom of the container. When data stored in the DRAM 14 is increased, the variable display elements D13, D12, D11 are displayed above the variable display elements D15, D14. Similarly, the number of variable display elements is increased in the upper direction from the bottom of the container. In the state that playback data is fully stored in the DRAM 14, all the variable display elements T and D15 to D1 are displayed on the display unit 19 as shown on the right end of FIG. 5.

The variable display element T blinks to let the user know that playback data is constantly passed through the DRAM 14.

An amount of data stored in the DRAM 14 can be conceptually explained with the image of "water in a bucket", for example. That is, an amount of water corresponds to the amount of data. Since in the vibration isolating mode the variable display elements T and D15 to D1 are displayed within the fixed display elements C1, C2 (buckets) which urge the user to remember the storage capacity of the DRAM 14 in response to the amount of data (water), the user can recognize the data amount relatively easily.

When the amount of data stored in the DRAM 14 becomes zero, the disc reproducing apparatus and recording apparatus cannot effect the function to prevent a reproduced sound from being interrupted. Nevertheless, since the graphic pattern shown on the left end of FIG. 5 is displayed on the display unit 19, the user can visually confirm by the above displayed graphic pattern the state that the amount of data becomes zero. That is, the user can confirm from the change of the displayed graphic patterns shown in FIG. 5 that the DRAM 14 is operated effectively. When a reproduced sound is interrupted during the playback mode under the state such that the graphic pattern on the left end of FIG. 5 is displayed, the user can visually confirm that the reproduced sound is interrupted due to an external disturbance that exceeds the storage capacity of the DRAM 14. Further, when the reproduced sound is interrupted under the condition such that the graphic pattern shown on the right end of FIG. 5 (i.e., a full buffer), for example, is displayed, the user can visually confirm that the DRAM 14 is not operated effectively.

The system controller 18 detects the change of the amount of data stored in the DRAM 14 through the memory controller 13. The system controller 18 determines on the basis of the increase or decrease of the data stored in the DRAM 14 that the DRAM 14 is effectively operated. Then, the system controller 18 allows the display unit 19 to display the change of the data amount.

Figure 6:
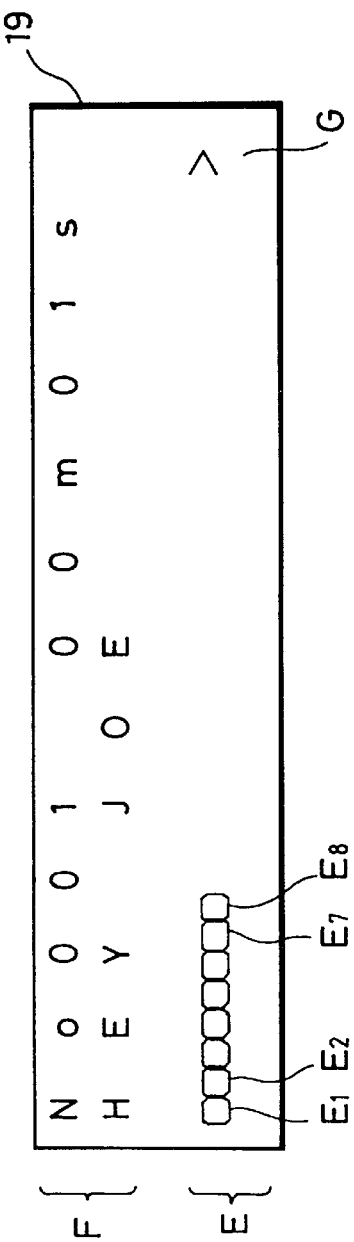
FIG. 6 is a schematic diagram used to explain another example of the graphic pattern displayed on the display unit shown in FIG. 1.

FIG. 6 of the accompanying drawings shows a second example of the graphic pattern displayed on the display unit 19. According to this embodiment, by a display element F of a so-called 7-segment type, a serial number (No. 001) of the magneto-optical disc 2, a playback time (00 m 01 s) and a title (HEY JOE) of a piece of music now being played are respectively displayed on the display unit 19. A variable display element E is disposed under the display element F. This variable display element E comprises eight elements E1 to E8 any one of which can be energized in response to the above data amount of the DRAM 14. A fixed display element G, disposed on the right side of the variable display element E, is energized to indicate that the magneto-optical disc 2 is being played back.

Figure 7A:
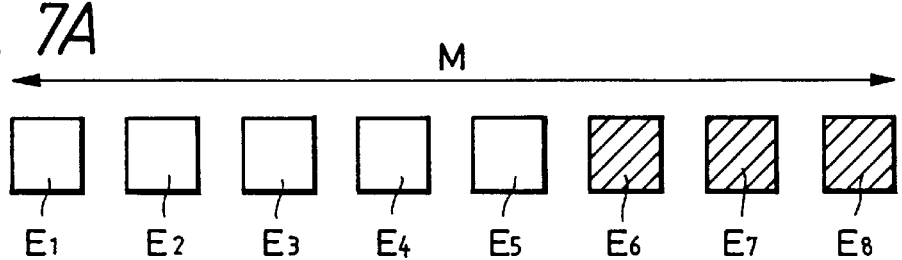
FIGS. 7A and 7B are respectively diagrams used to explain an example of graphic pattern displayed by a fixed display element in FIG. 6 in the recording mode.
Figure 7B:
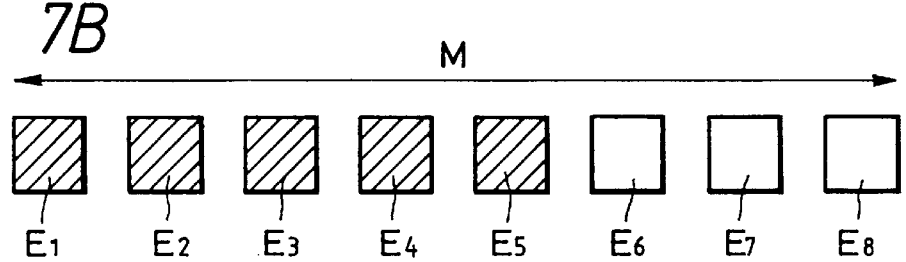
Figure 8A:
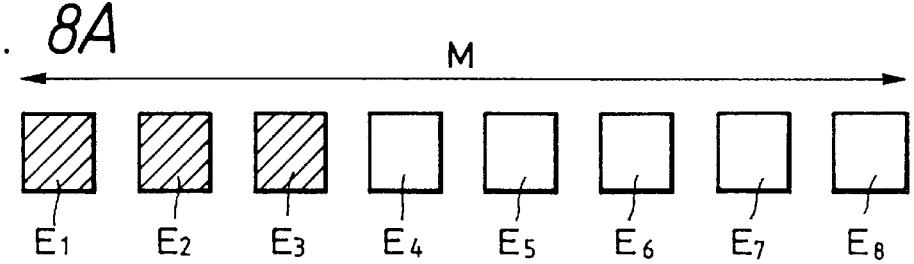
FIGS. 8A and 8B are respectively diagrams used to explain another example of graphic pattern displayed by the fixed display element in FIG. 6 in the playback mode.
Figure 8B:
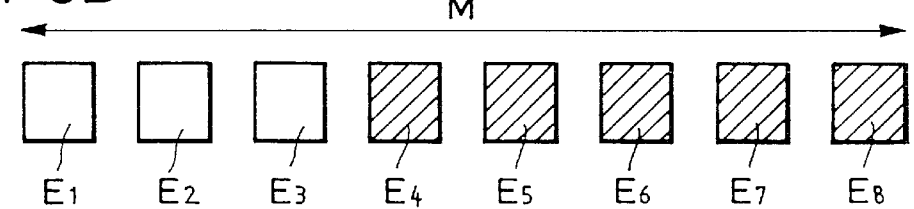

The variable display element E carries out the display as shown in FIGS. 7A, 7B or FIGS. 8A, 8B of the accompanying drawings. FIGS. 7A, 7B show the displayed state in the recording mode and FIGS. 8A, 8B show the displayed state in the playback mode.

As shown in FIG. 7A, the storage capacity M of the DRAM 14 is indicated by eight variable display elements E1 to E8. Of the storage capacity M, the elements whose number corresponds to the amount of data stored in the DRAM 14 are energized and remaining elements are disabled. A contour portion of each variable display element E1 to E8 is constantly lit (variable display elements E1 to E8 can be considered as fixed display elements in this sense) regardless of the energized or disabled state thereof so that the user can visually confirm the total number of the elements (storage capacity of the DRAM 14) on the basis of the above display. In the embodiment shown in FIG. 7A, of eight display elements, three display elements E6 to E8 on the right side are energized and remaining five display elements E1 to E5 on the left side are disabled. Therefore, the user can visually confirm that a ratio of the amount of stored data is ⅜ at present.

FIG. 7B shows the example such that the elements E1 to E5 corresponding to the capacity in which no data is stored are energized while the elements E6 to E8 corresponding to the capacity in which data are stored are disabled. This display can achieve effects similar to those of the display shown in FIG. 7A.

FIGS. 8A, 8B show examples of the displayed condition in the playback mode. As shown in FIG. 8A, to indicate the condition that data are stored in ⅜ of the total storage capacity M of the DRAM 14, the three display elements E1 to E3 on the left side are energized and five display elements E4 to E8 on the right side are disabled. FIG. 8B shows the example such that, while the elements corresponding to the amount of stored data are disabled and elements corresponding to the amount of data which are not stored are energized.

In the embodiment shown in FIGS. 7A, 7B, as the amount of recorded data is increased, the display elements are energized sequentially from right to left. In the embodiment shown in FIGS. 8A, 8B, the display elements are sequentially energized from the left to right. If the direction in which the display elements are sequentially energized is changed, then the user can intuitively recognize the status of the display, i.e., whether the display is the display in the recording mode or in the playback mode.

The display elements E1 to E8 can also display the level of the audio signal that is recorded on and reproduced from the magneto-optical disc 2. In this case, the display of the level of the audio signal and the display of the amount of stored data can be selectively changed-over by operating the key input operation unit 20.

According to the disc reproducing apparatus and disc recording apparatus of the present invention, the amount of data stored in the memory is displayed so that the user can recognize the operation state of the memory intuitively and readily.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A disc reproducing apparatus in which a data signal recorded on a disc is optically read out from said disc and reproduced as a data signal, comprising:

pickup means for tracing a track formed on said disc to optically read out the signal recorded on said disc;

first decoding means for decoding an output signal of said pickup means and then outputting digital data at a first transfer rate;

memory means in which digital data output from said first decoding means is stored temporarily;

control means for controlling write and read of said memory means such that said digital data output from said first decoding means is intermittently written in said memory means at said first transfer rate and said digital data written in said memory means is continuously read out from said memory means at a second transfer rate lower than said first transfer rate;

second decoding means for decoding said digital data read out from said memory means and outputting data signal at said second transfer rate;

calculating means for calculating an amount of digital data stored in said memory means; and display means for providing a graphic representation of an amount of said digital data stored in said memory means as calculated by the calculating means to thereby permit a visual confirmation of a change in of said amount.

2. The disc reproducing apparatus according to claim 1, wherein said control means includes a write pointer representative of a write address of the digital data stored in said memory means and a read pointer representative of a read address of the digital data read out from the memory means, said control means controlling said memory means on the basis of said write pointer and said read pointer.

3. The disc reproducing apparatus according to claim 2, wherein said write pointer is incremented at a speed corresponding to said first transfer rate when said digital data is written in said memory means and said read pointer is incremented at a speed corresponding to said second transfer rate when said digital data is read out from said memory means.

4. The disc reproducing apparatus according to claim 2, wherein said display means provides the graphic representation on the basis of said write pointer and said read pointer.

5. The disc reproducing apparatus according to claim 1, wherein said display means, in response to a selection of a vibration isolation mode, generates a fixed display element in the form of an image of a container representative of a storage capacity of said memory means and, when digital data is stored in said memory means, further generates at least one variable display element disposed at a position within said fixed display element, such that a quantity of said variable display elements is representative of an amount of digital data stored in said memory means.

6. The disc reproducing apparatus according to claim 1, wherein said display means includes a plurality of variable display elements continuously and sequentially aligned from a first end to an opposite end, such that a quantity of variable display elements are sequentially driven from the first end towards the opposite end corresponding to an amount of data stored in said memory means.

7. The disc reproducing apparatus according to claim 1, wherein said display means further comprises a display element which blinks in response to a flow of data through the memory means.

8. A disc reproducing apparatus in which a data signal recorded on a disc is optically read out from said disc and reproduced as a data signal, comprising:

pickup means for tracing a track formed on said disc to optically read out the signal recorded on said disc;

first decoding means for decoding an output signal of said pickup means and then outputting digital data at a first transfer rate;

memory means in which digital data output from said first decoding means is stored temporarily;

control means for controlling write and read of said memory means such that said digital data output from said first decoding means is intermittently written in said memory means at said first transfer rate and said digital data written in said memory means is continuously read out from said memory means at a second transfer rate lower than said first transfer rate;

second decoding means for decoding said digital data read out from said memory means and outputting data signal at said second transfer rate;

calculating means for calculating an amount of digital data stored in said memory means; and display means for providing a graphic representation of an amount of said digital data stored in said memory means as calculated by the calculating means to thereby permit a visual confirmation of a change in of said amount;

wherein the data signal output by the second decoding means is an audio signal, the disc reproducing apparatus further comprising:

switching means for selecting for display by said display means one of a graphic representation of a level meter indicating an output level of the audio signal and a graphic representation of the amount of digital data stored in said memory means.

9. A disc recording apparatus in which an input digital data signal is encoded and recorded on a disc, comprising:

first encoding means for compressing the input digital data signal;

memory means for temporarily storing compressed data from said first encoding means;

second encoding means for intermittently receiving the compressed data stored in said memory means and outputting encoded data as recording data to be recorded on said disc at a predetermined position;

control means for controlling said memory means such that said compressed data from said first encoding means is continuously written in said memory means and said compressed data stored in said memory means is intermittently read out from said memory means; and display means for providing a graphic representation of an amount of said compressed data stored in said memory means to thereby permit a visual confirmation of a change in said amount.

10. The disc recording apparatus according to claim 9, wherein said control means includes a write pointer representative of a write address of the compressed data stored in said memory means and a read pointer representative of a read address of the compressed data read out from the memory means, said control means controlling said memory means on the basis of said write pointer and said read pointer.

11. The disc recording apparatus according to claim 10, wherein said write pointer is incremented at a speed corresponding to a bit rate at which said compressed data is written in said memory means and said read pointer is intermittently incremented at a speed corresponding to a speed at which said recording data is recorded on said disc when an amount of data, which is stored in said memory means and not yet read out, exceeds a predetermined data amount.

12. The disc recording apparatus according to claims 10 or 11, wherein said display means provides the graphic representation on the basis of said write pointer and said read pointer.

13. The disc recording apparatus according to claim 9, wherein said display means, in response to a selection of a vibration isolation mode generates a fixed display element in the form of an image of a container representative of a storage capacity of said memory means and, when compressed data is stored in said memory means, further generates at least one variable display element disposed at a position within said fixed display element, such that a quantity of said variable display elements is representative of an amount of compressed data stored in said memory means.

14. The disc recording apparatus according to claim 9, wherein said display means includes a plurality of variable display elements continuously and sequentially aligned a first end to an opposite end, such that a quantity of variable display elements are sequentially driven from the first end towards the opposite end corresponding to an amount of data stored in said memory means.

15. A disc recording apparatus in which an input digital data signal is encoded and recorded on a disc, comprising:

first encoding means for compressing the input digital data signal;

memory means for temporarily storing compressed data from said first encoding means;

second encoding means for intermittently receiving the compressed data stored in said memory means and outputting encoded data as recording data to be recorded on said disc at a predetermined position;

control means for controlling said memory means such that said compressed data from said first encoding means is continuously written in said memory means and said compressed data stored in said memory means is intermittently read out from said memory means; and display means for providing a graphic representation of an amount of said compressed data stored in said memory means to thereby permit a visual confirmation of a change in said amount;

wherein the input digital data signal is an audio signal, the disc recording apparatus further comprising:

switching means for selecting for display by said display means one of a graphic representation of a level meter indicating an input level of the audio signal and a graphic representation of the amount of compressed data stored in said memory means.

* * * * *

UNITED STATES PATENT AND TRADEMARK OFFICE
CERTIFICATE OF CORRECTION

PATENT NO. : 6,181,653 B1
DATED : January 30, 2001
INVENTOR(S) : Isao Wada et al.

Page 1 of 1

It is certified that error appears in the above-identified patent and that said Letters Patent is hereby corrected as shown below:

Column 1,
Line 14, change "present" to -- prevent --.
Line 21, delete "on".
Line 38, change "causing the" to -- subject to --.
Line 40, change "present" to -- prevent --.
Line 56, change "present" to -- prevent --.

Column 4,
Line 26, delete "an" (second occurrence).

Column 8,
Line 49, after "confirm" insert --, easily and readily, --.
Line 50, change "that" to -- in which --.

Column 12,
Line 35, after "aligned" insert -- from --.

Signed and Sealed this

Twenty-sixth Day of February, 2002

*Attest:*

JAMES E. ROGAN
*Attesting Officer*    *Director of the United States Patent and Trademark Office*